Patented Dec. 30, 1941

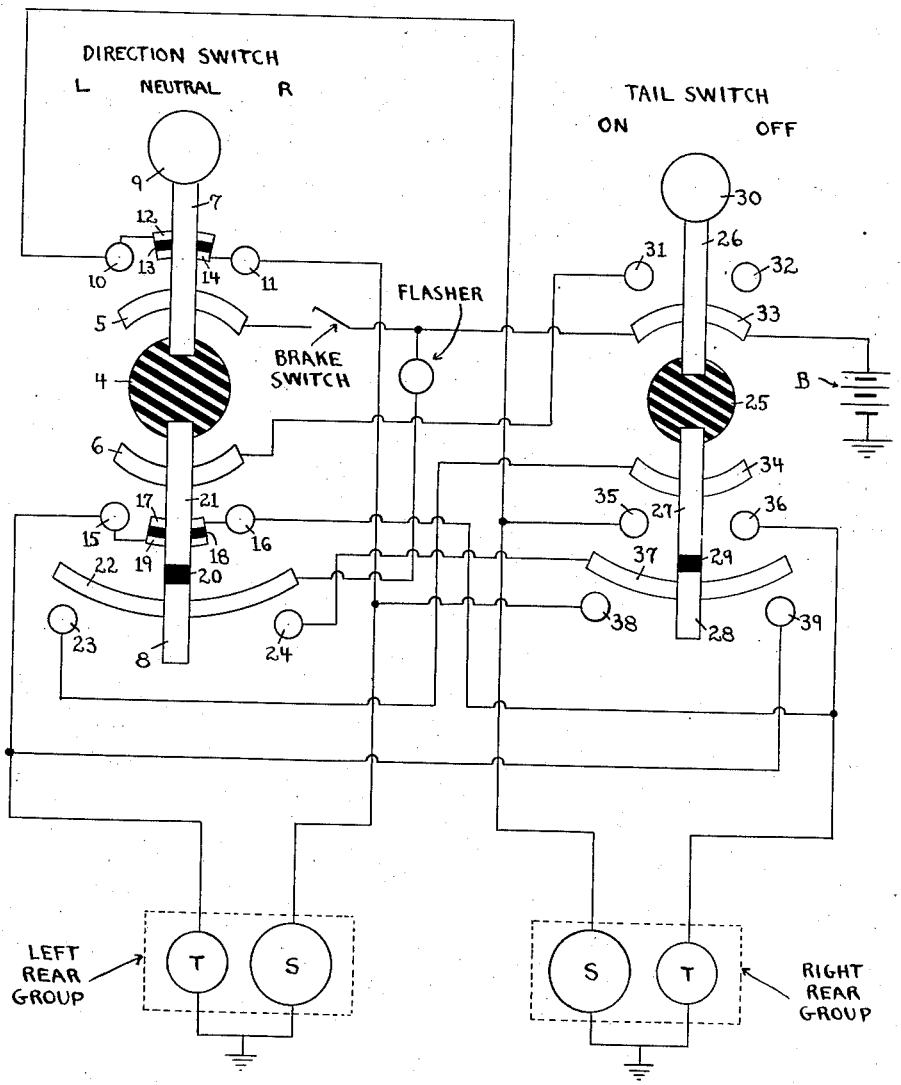

2,267,743

UNITED STATES PATENT OFFICE 2,267,743

SIGNAL

Howard J. Murray, Jr., New York, N. Y.

Application September 29, 1939, Serial No. 297,019

5 Claims. (Cl. 177—337)

The present invention relates in general to signalling systems for vehicles, and more specifically to a direction signalling system for use on automotive vehicles equipped with steering and braking mechanisms.

A majority of automotive vehicles are now equipped with two pairs of signal lights on the rear thereof. These consist of a pair of tail lights of relatively small candle power mounted on opposite sides of the vehicle, and a pair of stop lights of greater candle power also mounted on opposite sides of the vehicle adjacent the tail lights. As a rule two casings or containers are provided, each holding one tail light and one stop light.

Many signal systems are known in the art in which a direction signal is indicated by the flashing of a lamp. Usually this lamp is the standard stop lamp of the vehicle, but it may be the tail lamp or even a special lamp having no other function. However it has been found in practice that such a method of direction signalling is not suitable for all conditions encountered in the operation of the vehicle. For instance, if the stop light is flashed the resulting illumination, while adapted for daylight operation, is too strong for night driving. If the tail lamp is flashed it can be seen only with difficulty in bright sunlight. In other words no single lamp can have an intensity of illumination ideal for all operating conditions.

The present invention provides means whereby the stop lamp is utilized to flash as a direction signal during the day and the tail lamp similarly utilized for night driving. Since the tail light switch of the vehicle is normally closed during the latter interval, such closing is employed to effect a change in the lamp flashed. No mental or physical effort is required of the vehicle operator in making this selection, as he has only to operate the tail light switch to illuminate the vehicle tail lights as is now the universal custom.

The invention also provides means whereby the flashing of either the tail or the stop lamp on one side of the vehicle renders the remaining lamp on that side incapable of illumination. However either lamp on the opposite side of the vehicle may be illuminated in the usual manner.

The invention also proposes to accomplish these results in a simple, inexpensive manner by utilizing many standard parts at present found on most automotive vehicles. In addition to the circuit connections the only non-conventional parts employed are a pair of switches and a current interrupter. As a matter of fact one of these switches replaces the conventional tail light switch construction.

Various other objects and advantages of the invention will be apparent from the description and drawing.

The single figure of the drawing shows in partly diagrammatic manner a preferred circuit embodying my invention.

The drawing shows a number of conventional elements found on most automotive vehicles. These include a battery B, a normally open brake pedal operated switch, a pair of tail lights, and a pair of stop lights. Also shown is a tail switch having the usual "off" and "on" positions, a current interrupter or flasher, and a direction signal control switch having "right," "left," and "neutral" positions.

Although the tail switch has been illustrated with the handle midway between the "off" and "on" positions, it will be understood that such a situation occurs only while the handle is being manually actuated, and that upon release the handle will assume either the "off" or the "on" position indicated. The direction signal switch, however, has three operative positions as shown.

A pivotal ball 4 formed of electrically insulative material has positioned therein two arms or levers 7 and 21, the latter having an extension 8. The two arm portions 3 and 21 are insulated from each other by the portion 20. A handle 9 is provided for manual actuation. A number of switch contacts 5, 6, 10, 11, 12, 14, 15, 16, 17, 19, 22, 23, and 24 are illustrated, the contacts 12 and 14 being separated by the insulating portion 13, and the contacts 17 and 19 being similarly separated by the insulating portion 18.

Another pivotal ball 25 is formed of insulative material and has positioned therein two arms of levers 26 and 27, the latter having an extension 28 separated from the arm 27 by the insulating portion 29. The arm 26 has a handle 30. Elements 31 thru 39 are switch contacts.

The operation of the illustrated system is believed to be apparent from the drawing, as it is only necessary to assume selective closing of the various switches and trace the resulting flow of current. However it will be said that with the direction switch in neutral position, the tail switch in "off" position, and the brake switch open, no current will flow.

Subsequent closing of the tail switch will illuminate both tail lights. Closing of the brake switch will illuminate both stop lights. If the direction switch then be actuated to a direction signalling position, as for example to the left, (the tail switch is still closed), the left tail light will flash, the left stop light will be deenergized, and both right rear lights will continue to be illuminated. Subsequent opening of the tail switch will cause the extension 28 to disengage the contact 39 and to engage the contact 38. The former contact being connected to the left tail light such disengagement will result in a deenergization of that light. The latter being connected to the left stop light such contact will cause flashing of that light through a circuit including elements B, 33, flasher, 22, 8, 24, 37 and 38. At the same time disengagement of the arm 26 with the contact 31 will break the flow of current to the right tail light through the elements 6, 21 and 16. Subsequent opening of the brake switch will break the circuit through elements 5, 7 and 10 to deenergize the right stop light. Thus the brake and tail switches have been opened, and with the direction switch remaining in left indicating position the left stop light flashes and the other lights are not energized.

Thus it will be seen that closing of the direction switch in a direction signalling position will cause a rear light to flash. This light will be selected in accordance with the position of the tail switch. If the tail switch is "off," the light flashed will be the stop light. If the tail switch is "on," the light flashed will be the tail light. The remaining light in the same group with the flashing light is rendered incapable of illumination during the flashing period. The group of lights on the opposite side of the vehicle from the flashing light perform their usual function without regard to the flashing.

I claim:

1. In a signalling system on a vehicle; two tail lights; two stop lights; said light being arranged in pairs on relatively opposite sides at the rear of the vehicle, each pair consisting of one tail light and one stop light; a tail light switch; means, including a source of current, responsive to the closing of the tail light switch to constantly energize both tail lights; a direction signal control switch having two operative positions; means, including a current interrupter, subsequently responsive to the closing of the direction signal control switch in either operative position to intermittently energize one of the tail lights while the other tail light remains constantly energized; means, including the tail light switch and subsequently responsive to the opening thereof to deenergize the said constantly energized tail light, deenergize the said intermittently energized tail light, and intermittently energize the stop light in the same pair with the formerly intermittently energized tail light; all of said means having elements in common.

2. The combination of claim 1 with a normally open brake pedal operated switch, whereby the subsequent closing of the switch will constantly energize the formerly deenergized stop light without affecting the intermittently energized status of the other stop light.

3. In a vehicle signalling system; a pair of tail lights mounted on opposite sides of the vehicle; a pair of stop lights also mounted on opposite sides of the vehicle and visible from the rear thereof; a manually operable switch having two direction signalling positions; means, including a source of current and a current interrupter, responsive to the closing of the said switch in either direction signalling position to intermittently energize one of the said stop lights; a tail light switch; means responsive to the closing of the said tail light switch while the said first mentioned switch remains closed to deenergize the said intermittently energized stop light, intermittently energize the tail light on the same side of the vehicle therewith, and constantly energize the tail light on the opposite side of the vehicle therefrom; both of said means having elements in common.

4. In a vehicle signalling system; a tail light; a stop light; both lights being located on one side at the rear of the vehicle; a direction signal switch; a tail light switch; a stop light switch; means, including a source of current, responsive to the closing of the stop light switch while the direction and tail switches are open to constantly energize the stop light; means, including a current interrupter, subsequently responsive to the closing of the direction signal switch to intermittently energize the stop light; and means, including the tail light switch and subsequently responsive to the closing thereof, to intermittently energize the tail light and deenergize the stop light; all of said means having elements in common.

5. In a signalling system for vehicles; a pair of tail lights; a pair of stop lights; one tail light and one stop light being grouped on each side at the rear of the vehicle; stop light switch; means, including a source of current, responsive to the closing of the stop light switch to constantly energize both stop lights; a direction signal control switch having two operative positions; means, including a current interrupter, responsive to the closing of the direction signal control switch in either operative position while the stop light switch remains closed to intermittently energize one of the said stop lights while the other stop light remains constantly energized; a tail light switch; means, including the tail light switch and responsive to the closing thereof while the first two mentioned switches remain closed, to deenergize the intermittently energized stop light, to intermittently energize the tail light on the same side of the vehicle therewith, and to constantly energize the tail light on the opposite side of the vehicle without affecting the constantly energized stop light; all of said means including elements in common.

HOWARD J. MURRAY, Jr.